(12) United States Patent
Tapscott

(10) Patent No.: US 8,646,651 B2
(45) Date of Patent: Feb. 11, 2014

(54) AUTOMATED BRAILLE INSERTER

(75) Inventor: Edward James Tapscott, Bundaberg (AU)

(73) Assignee: Braille-Oz Pty Ltd, Queensland (AU)

( * ) Notice: Subject to any disclaimer, the term of this patent is extended or adjusted under 35 U.S.C. 154(b) by 1197 days.

(21) Appl. No.: 12/440,518

(22) PCT Filed: Sep. 12, 2007

(86) PCT No.: PCT/AU2007/001352
§ 371 (c)(1),
(2), (4) Date: Mar. 9, 2009

(87) PCT Pub. No.: WO2008/031156
PCT Pub. Date: Mar. 20, 2008

(65) Prior Publication Data
US 2010/0003646 A1 Jan. 7, 2010

(30) Foreign Application Priority Data

Sep. 12, 2006 (AU) ................................ 2006905068
Feb. 20, 2007 (AU) ................................ 2007900860

(51) Int. Cl.
*G09B 21/00* (2006.01)

(52) U.S. Cl.
USPC ......................................... 221/232; 221/268

(58) Field of Classification Search
USPC ......... 221/200, 202, 208, 224, 233–236, 263, 221/264, 268, 276, 278, 281, 232
See application file for complete search history.

(56) References Cited

U.S. PATENT DOCUMENTS 4,230,236 A * 10/1980 Boulter ......................... 221/190
4,544,082 A * 10/1985 Becker .......................... 221/200
(Continued)

FOREIGN PATENT DOCUMENTS

EP 1494195 A2 1/2005
FR 350605 6/1905
FR 2669848 A1 6/1992

OTHER PUBLICATIONS

Australian Patent Application No. 2007295947, Examiner's Report dated Nov. 23, 2010, IP Australia.

(Continued)

*Primary Examiner* — Gene Crawford
*Assistant Examiner* — Kelvin L Randall, Jr.
(74) *Attorney, Agent, or Firm* — Williams Mullen, PC; Thomas F. Bergert

(57) ABSTRACT

An automated Braille inserter for inserting a Braille element into a surface including a container for containing a plurality of Braille elements; a drive pin in operative juxtaposition with respect to said container and adapted for movement along a drive axis between a receiving position and a driving position, and having a driving face for driving a Braille element from said Braille inserter; a Braille element passage operatively associated with said drive pin and providing operative passage of a Braille element from said container to a deployment position in operative alignment with said driving face of said drive pin; the drive pin being arranged in operative juxtaposition in respect of the container such that the Braille element passage is closed to receiving Braille elements from the container when the drive pin is the driving position, but may receive a predetermined number of Braille elements into said Braille element passage when the drive pin is in the receiving position.

13 Claims, 6 Drawing Sheets

(56) References Cited

U.S. PATENT DOCUMENTS

| | | |
|---|---|---|
| 5,245,744 A | 9/1993 | Edgerton |
| 5,403,189 A | 4/1995 | Edgerton |
| 2003/0022137 A1* | 1/2003 | Rahamim et al. ............ 434/115 |

OTHER PUBLICATIONS

Australian Patent Application No. 2007295947, Applicant's Response dated Nov. 29, 2010.
Australian Patent Application No. 2007295947, Notice of Acceptance dated Dec. 23, 2010, IPAustralia.
EP Patent Application No. 07800306.8, European Patent Office Supplementary Search Report dated May 26, 2011, EPO.
Gravograph: "Raster? Pen Braille Dispenser/Inserter", Announcement, Gravograph, Apr. 1, 2002.
International Preliminary Report on Patentability Jul. 24, 2008, IPEA/AU.
Officer Sushil Aggarwal, International Search Report, mailed Jul. 24, 2008, corresponding PCT application No. PCT/AU2007/001352, Applicant, Braille-Oz Pty Ltd et al.
Officer Sushil Aggarwal, Written Opinion of International Search Report, mailed Jul. 24, 2008, corresponding PCT application No. PCT/AU2007/001352, Applicant, Braille-Oz Pty Ltd et al.

* cited by examiner

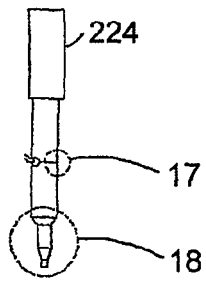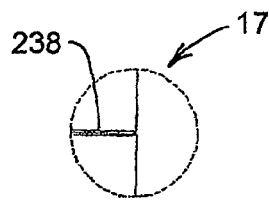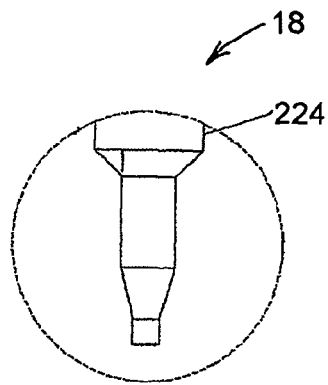
Fig. 16　Fig. 17　Fig. 18
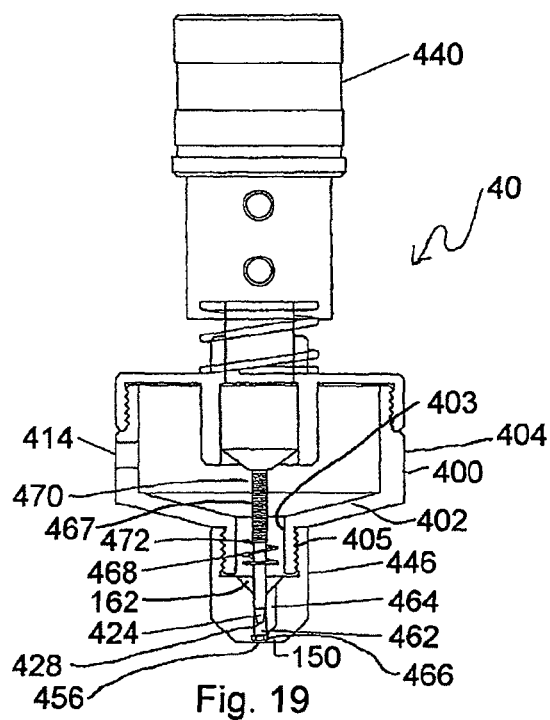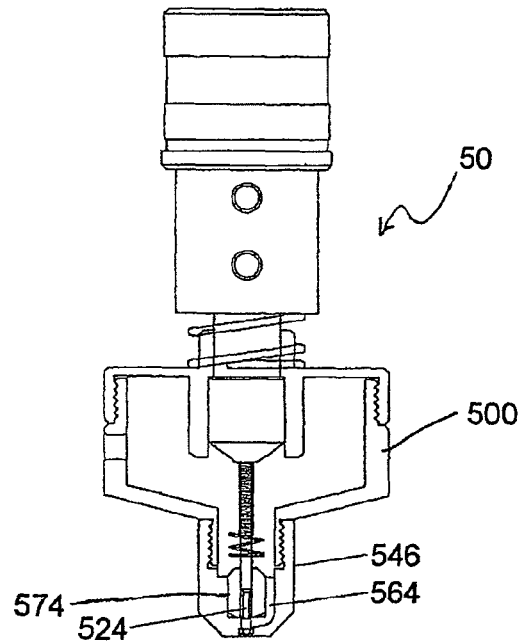
Fig. 19　Fig. 20

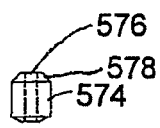
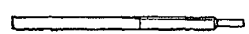
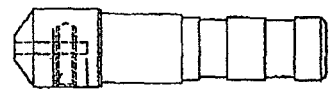
Fig. 21  Fig. 22  Fig. 23
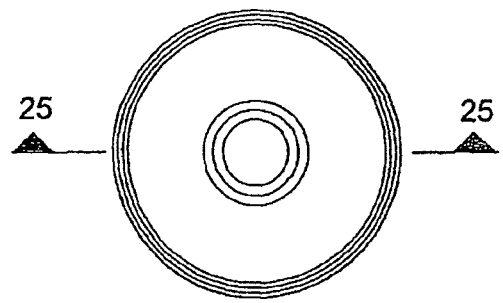
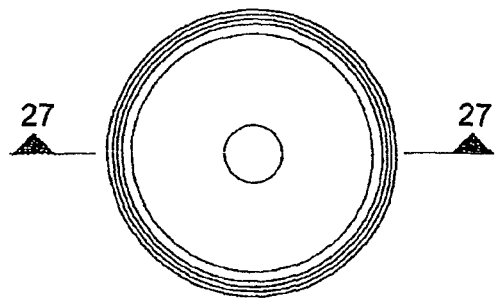
Fig. 24  Fig. 26
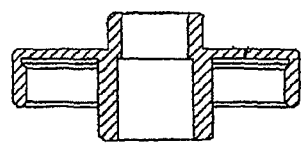
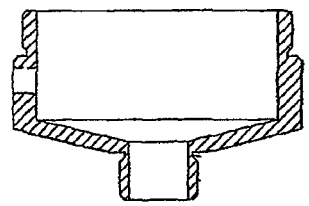
Fig. 25  Fig. 27

AUTOMATED BRAILLE INSERTER

This application is a U.S. Nationalization of PCT International Application No. PCT/AU07/01352 filed 12 Sep. 2007, entitled "Automated Braille Inserter," which claims priority to AUSTRALIAN Patent Application No. 2001900860 filed 20 Feb. 2007, and AUSTRALIAN Patent Application No. 2006905068 filed 12 Sep. 2006, the contents of the foregoing applications are incorporated herein, in their entirety, by this reference.

FIELD OF INVENTION

The present invention relates to an automated Braille inserter. The invention has particular application to a Braille inserter for inserting Braille elements into respective preformed holes to form Braille signage. However, the invention is not limited to this field of use.

BACKGROUND ART

Braille printing has been available for about 180 years, and naturally, signage incorporating Braille print has followed. Because Braille print comprises raised dots to provide elements of tactile sensibility, signage has been difficult to produce because the traditional method of embossing is not available. Engraving of signage therefore usually required all but the raised portions of the Braille lettering to be cut away, with the result that there was material wastage, excessive wear on cutting or engraving tools, and a protraction in time taken to produce Braille signage.

However, in 1905, a technique was developed in France for placing Braille lettering on signage which involved drilling holes of a predetermined depth into the sign, fixing or fastening a Braille element of a predetermined height, such as a ball, into each hole so that in the finished sign, the Braille elements all extend outwardly of the sign substantially the same amount. In order for the technique to be effective, the Braille elements extend into the hole substantially the same amount, the Braille elements being substantially identical with one another. The technique, as exemplified in French Patent No. 350,605, published 20 Jun. 1905 has become well known in the art. Further examples and improvements may be found such as for example in French Patent No. 2,669,848 published 5 Jun. 1992. Although it is not necessarily the case that these patent specifications form part of the common general knowledge in the art, it is believed by the inventor that the technique of inserting Braille elements into preformed holes to form Braille signage is well known in the art and has been so for at least a century.

Conventional Braille inserters have required significant time to be positioned accurately over a hole and insert a Braille element therein. Several attempts have been made to reduce this time by automation of the process. For example, a Braille inserter and method are disclosed in U.S. Pat. Nos. 5,245,744 and 5,403,189. The apparatus may be used to drill holes in a sign face in an accurate position so that ball bearings or the like may be inserted therein manually using a variety of different inserters. Automated Braille inserters have been provided which can be positioned accurately for inserting Braille elements in less time. Such inserters typically have a drive pin for driving a Braille element into a hole, but have been prone to jamming and/or breakdown, for example, by the way the Braille elements are fed to the drive pin.

In this specification, terms such as up, down, above, below, and equivalents thereof may be used to describe the invention in its normal orientation. However, it will be appreciated that such terms do not limit the invention to any particular orientation.

The present invention aims to provide an automated Braille inserter which alleviates the aforementioned problems of the prior art. Other aims and advantages of the invention may become apparent from the following description and claims.

DISCLOSURE OF THE INVENTION

With the foregoing in view, the present invention resides broadly in an automated Braille inserter for inserting one or more Braille elements into a surface including:
a basin for holding a plurality of Braille elements;
a drive pin having a central longitudinal axis and a tip and being adapted to drive one of the Braille elements into the surface;
a shaft connected to said basin and within which said drive pin is moveable along its longitudinal axis; and
a Braille element receiving area provided in said drive pin and spaced from said tip, said receiving area being adapted to receive therein at least one Braille element.

Preferably, the Braille element receiving area includes an upper surface, a lower surface a fixed distance from the upper surface, the receiving area being moveable in a plane parallel to the central longitudinal axis of the drive pin to facilitate movement of a Braille element along a transit path between the basin and a position where the drive pin may drive the Braille element into the surface. Preferably, the basin extends around more than one half the circumference about the central axis of the drive pin. Preferably the receiving area is configured to permit only a single Braille element to be received therein and shaped to be complementary to the shape of the Braille elements to be inserted in the sign. Preferably, the receiving area is provided in the drive pin.

In a preferred form, the automated Braille inserter includes a chamber spaced apart from the basin, the receiving area being moveable from a first position at which the receiving area is capable of receiving a Braille element from the basin to a second position where the Braille element is capable of being released into the chamber. Preferably, the chamber includes a sidewall completely surrounding and spaced-apart from the drive pin when the drive pin is in a rest position. Preferably, the receiving area is in air communication with the chamber while in the first position.

In a preferred form, the automated Braille inserter includes a passage connecting the receiving area to the chamber, the passage having a minimum cross sectional dimension that prevents movement of the Braille element therethrough. Preferably, movement of the drive pin is at least in part synchronised with movement of the receiving area.

Preferably, the basin includes a floor arranged at a non-perpendicular angle relative to the central longitudinal axis of the drive pin. Preferably, the non-perpendicular angle is generally 60 degrees to the central longitudinal axis. Preferably, the basin extends completely around the circumference of the central longitudinal axis of the drive pin. Preferably, the drive pin is concentrically located relative to the basin.

In a preferred form, the automated Braille inserter includes agitation means within the interior of the basin for agitating Braille elements which may be within the basin. Preferably, the agitation means includes a spring. Preferably, the agitation means projects from the drive pin.

In another aspect, the present invention resides broadly in an automated Braille inserter for inserting a Braille element into a surface including:
a container for containing a plurality of Braille elements;

a drive pin in operative juxtaposition with respect to the container and adapted for movement along a drive axis between a receiving position and a driving position, and having a driving face for driving a Braille element from the Braille inserter;

a Braille element passage operatively associated with the drive pin and providing operative passage of a Braille element from the container to a deployment position in operative alignment with the driving face of the drive pin;

the drive pin being arranged in operative juxtaposition in respect of the container such that the Braille element passage is closed to receiving Braille elements from the container when the drive pin is the driving position, but may receive a predetermined number of Braille elements into the Braille element passage when the drive pin is in the receiving position.

In another aspect, the present invention resides broadly in a method of inserting a Braille element into a surface including:

providing a container for containing a plurality of Braille elements;

providing a drive pin in operative juxtaposition with respect to the container and adapted for movement along a drive axis between a receiving position at which a Braille element may be received into the passage and a driving position;

passing a Braille element along a Braille element passage from the container to a deployment position in operative alignment with a driving face of the drive pin;

moving the drive pin from the receiving position to the driving position whereupon the Braille element passage is closed to receiving Braille elements from the container and whereby the Braille element may be inserted into the surface.

In another aspect, the present invention resides broadly in a method of providing a Braille surface including:

forming a pattern of openings in a surface with a machine having an engraving element operatively associated therewith, the openings being so formed as to receive a Braille element; and driving a Braille element into at least one of the openings using a Braille inserter operatively attached to the machine.

Preferably, the method includes disengaging an engraving element from an engraving machine and engaging the Braille inserter to the engraving machine. The engraving element may be selected from any type of engraver apt for forming holes, apertures or openings in a surface and may include, for example, a laser.

In another aspect the present invention resides broadly in a method of inserting a Braille element into a surface including:

providing a container for containing a plurality of Braille elements;

providing a drive pin in operative juxtaposition with respect to the container and adapted for movement along a drive axis between a receiving position at which a Braille element may be received into the passage and a driving position;

passing a Braille element along a Braille element passage from the container to a deployment position in operative alignment with a driving face of the drive pin;

moving the drive pin from the receiving position to the driving position whereupon the Braille element passage is closed to receiving Braille elements from the container and whereby the Braille element may be inserted into the surface.

In one form of the invention, compressed is introduced into the chamber to agitate and/or move Braille elements therein. The air introduced into the basin may be compressed air, but it will be appreciated that instead or additionally thereto, a negative pressure may be applied externally of the basin.

In another aspect, the present invention resides broadly in a method of providing a Braille surface including:

forming a pattern of openings in a surface with a machine having an engraving element operatively associated therewith, the openings being so formed as to receive a Braille element; and driving a Braille element into at least one of the openings using a Braille inserter operatively attached to said machine.

The receiving area and transit path are preferably encompassed by the Braille element passage hereinbefore described. The receiving area is preferably configured to permit only a single Braille element to be received therein and shaped to be complementary to the shape of the Braille elements to be inserted in the sign. For example, where the Braille elements are substantially spherical, the walls of the receiving area are shaped to accommodate spherical Braille elements. Other shapes or Braille element may be used, such as oblate or prolate spheroids, or bullet, ogival or lozenge shaped Braille elements or the like. Generally speaking, it will be appreciated that the projecting portion of a Braille element on signage would typically be smooth and somewhat rounded. For the provision of Braille lettering in respect to signage, the surface referred to herein is typically the exposed face of a sign. The Braille elements are typically in the form of a substantially spherical ball or bead, but the Braille inserter of the present invention is not necessarily limited to spherical elements. It will be appreciated that the steps of the method of the present invention are not necessarily limited to any particular order herein described.

The container or basin for containing the Braille elements preferably includes a cap or lid. Preferably, the cap or lid is attached to the basin by snap or interference fit, but it will be appreciated that alternative attachment means such as threaded engagement of complementary fitting parts would provide the necessary functionality of attachment of parts to one another. Alternatively, where manufacture expediency or convenience warrants it, the parts may be integrally formed. The pin housing, pin cap and drive pin are preferably formed in or from stainless steel. The inserting cap is preferably formed in or from nylon. The basin and its cap are preferably formed in or from aluminium. Of course, other materials may be selected for the construction of the automated Braille inserter of the present invention as may be appropriate for particular applications.

Deployment of Braille elements may be by compressed air, but preferably, direct means such as a spring or selected configuration of the drive pin, may be used to move, disperse and/or agitate Braille elements. For example, the basin may be rotated, vibrated or moved axially, or in any combination of the above, to disperse Braille elements.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 16 is a partial side view of a drive pin of the Braille inserted of FIG. 14;

FIG. 17 is a detail side view of a groove leading to a Braille element receiving area of the drive pin of FIG. 16;

FIG. 18 is a detail side view of a leading end of the drive pin of FIG. 16;

FIG. 19 is a partial cross-sectional view of a second alternative Braille inserter according to the invention;

FIG. 20 is a partial cross-sectional view of a modified form of the second alternative Braille inserter of FIG. 19;

FIG. 21 is a side elevation of a nosecone bush of the Braille inserter of FIG. 20;

FIG. 22 is a side elevation of a drive pin of the Braille inserter of FIG. 20;

FIG. 23 is a side elevation of a drive housing of the Braille inserter of FIG. 20;

FIG. 24 is a plan view of the top of a ball cap holder of the Braille inserter of FIG. 20;

FIG. 25 is a cross-sectional side view of the ball holder cap along line 25-25 of FIG. 24;

FIG. 26 is a plan view of the top if a Braille element basin of FIG. 20;

FIG. 27 is a cross-sectional side view along line 27-27 of the Braille element basin of FIG. 26;

DETAILED DESCRIPTION OF THE DRAWINGS

Figure 1:
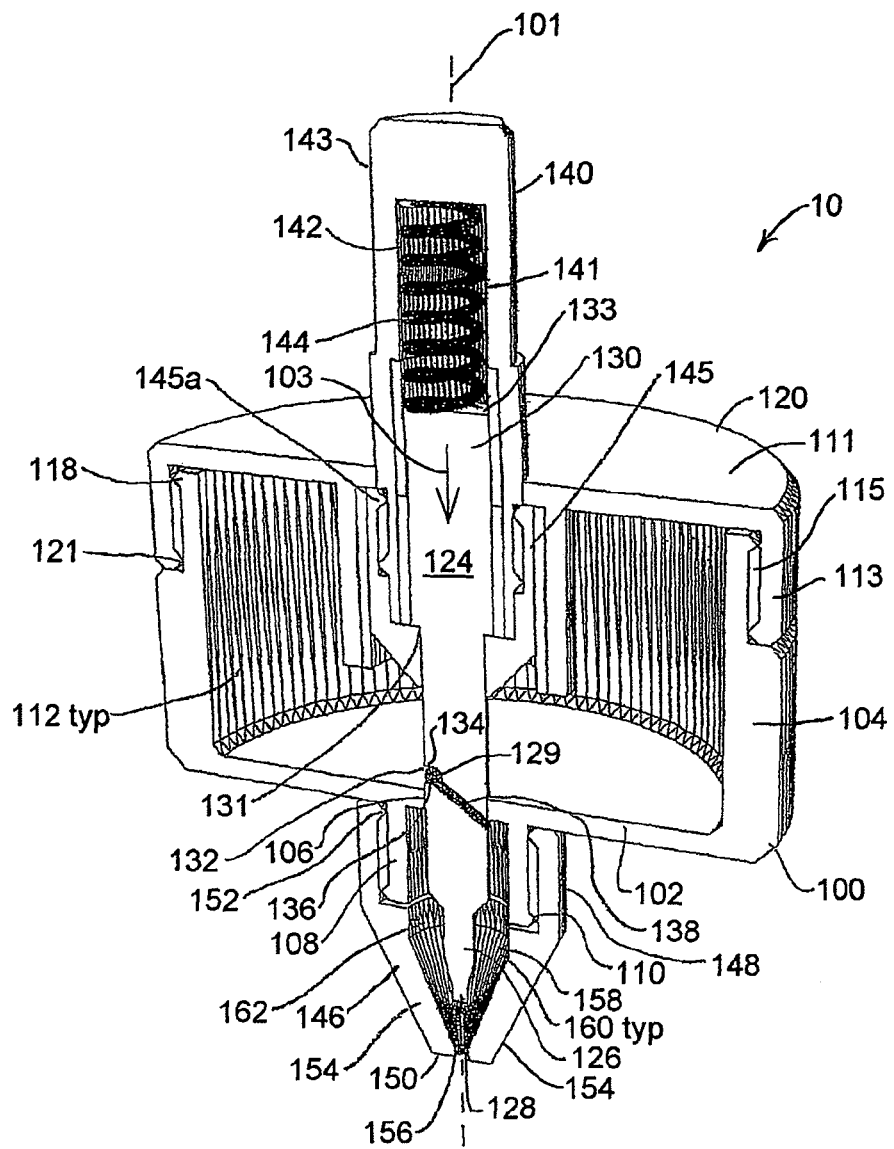
FIG. 1 is a partial cross-sectional pictorial view of a Braille inserter according to the invention.

In the drawings, wherever possible, like parts are given the same reference numerals, but in order to maintain clarity of the drawings, the parts are not necessarily given a reference numeral in every view depicting such parts. The Braille inserter 10 illustrated in FIGS. 1 to 13 includes a basin 100 for holding a plurality of Braille elements, the basin being substantially in the form of a cylinder of circular cross-section and of a height about the same as its diameter, the cylinder having a central longitudinal axis 101. Although not shown in the drawings, the Braille elements for use with the Braille inserter described in the Figs are in the form of substantially spherical balls.

The basin includes a floor 102 and a wall 104. The wall includes a plurality of grooves shown typically at 112 running substantially parallel to the central axis of the basin. The floor includes an opening 106 substantially centrally of the floor for passage of the drive pin therethrough. The wall 104 also includes a Braille element refill opening 114 about midway axially therealong and an air opening 116 near to, but spaced from, the floor as shown in particular in FIG. 6. The Braille element refill opening permits the basin to be refilled without disassembly of the Braille inserter. The air opening is configured for attachment to a compressed air source.

The basin further includes a lower wall portion 108 extending below the floor of the basin. The lower wall portion is cylindrical in form but of smaller diameter and height than the wall 104, the height of the lower wall portion being about the same as its diameter, and surrounding the opening, substantially coaxial therewith. The lower wall portion includes an outwardly projecting ridge 110 along its lower edge—that is, the edge remote from the floor of the basin. The ridge is provided about the outer circumference of the lower wall portion and provides a lower connection means configured for snap-fit engagement with an inserting cap 146.

The wall 104 of the basin also includes an upper circumferential rebate 115 and an upper outer ridge 118 running circumferentially about the edge of the rebate and providing a connection means for connecting a basin cap 120 thereto. The cap includes a lid portion 111 and depending from its circular periphery a cap wall 113. The inner face of the cap wall has an inner ridge 121 running circumferentially along the peripheral edge remote from the lid portion. The inner and outer ridges cooperate to facilitate substantially secure attachment of the cap to the basin by a snap fit engagement of the parts with one another. In the embodiment shown in FIG. 4, the cap and basin have a screw thread arrangement 123 as does the connection to the inserting cap 146. The basin cap also includes a cap opening 122 penetrating through and substantially central in respect of the lid portion. The cap opening is sized to accommodate a shaft 140 of cylindrical form coaxial with the axis of the basin and cap. The shaft is elongate in the axial dimension. The shaft projects outward from the lid of the cap. The shaft, also shown separately in FIG. 10, includes an internal passage 142 extending from the cap opening and continuous therewith in the axial dimension to a drive pin abutment 143 closing off the end of the internal passage and forming the distal extremity of the shaft. The outer circumferential face of the shaft is sized to engage with the chuck or clamp of an engraving machine.

The inserting cap 146 includes a cylindrical portion 148 substantially surrounding the lower wall portion and a frusto-conical portion 154 depending therefrom. The inserting cap also includes a drive cap opening 156 centrally of the frustum of the frusto-conical portion, the drive cap opening being dimensioned to be commensurate with a Braille element to permit passage of a Braille element through the drive cap opening only with the provision of a predetermined driving force.

Figure 4:
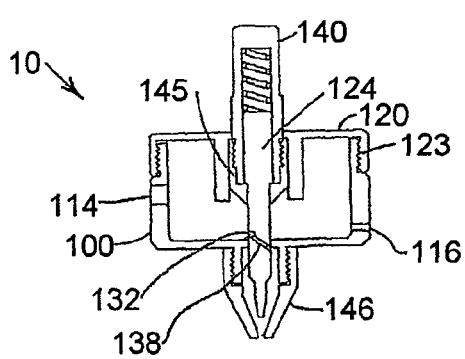
FIG. 4 is a cross-sectional view along line 4-4 of FIG. 5 of the Braille inserter of FIG. 1 showing details of threaded connection of parts.
Figure 5:
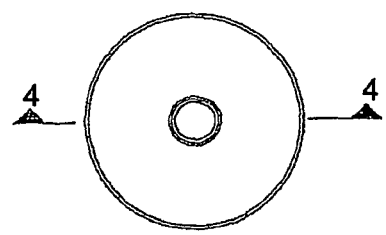
FIG. 5 is a plan view of the top of the Braille inserter of FIG. 4.
Figure 6:
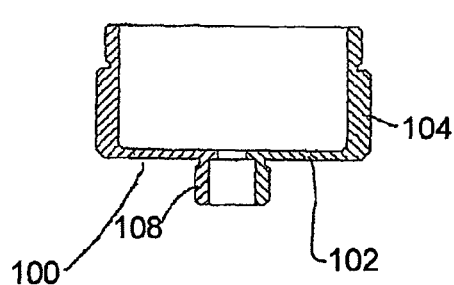
FIG. 6 is a cross-sectional view along line 5-5 of FIG. 7 of a Braille element basin for the Braille inserter of FIG. 1
Figure 7:
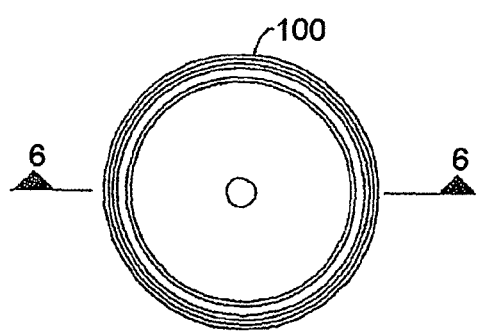
FIG. 7 is a plan view of the top of the Braille element basin of FIG. 6.
Figure 8:
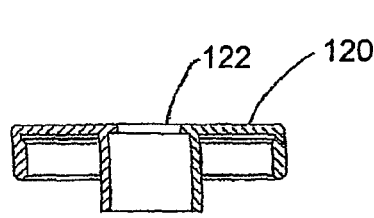
FIG. 8 is a cross-sectional view along line 8-8 of a cap engageable with the Braille element basin of FIG. 6.
Figure 9:
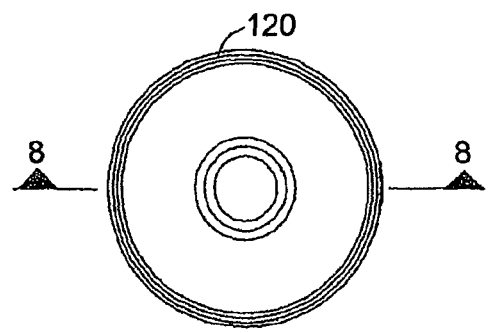
FIG. 9 is a plan view of the top of the cap of FIG. 8.
Figure 10:
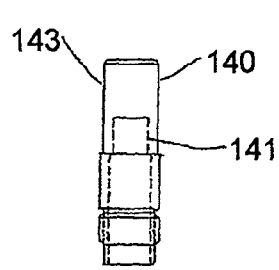
FIG. 10 is a side elevation of a pin housing of the Braille inserter of FIG. 1.
Figure 11:
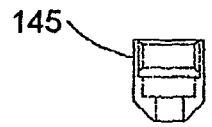
FIG. 11 is a side elevation of a pin cap for the Braille element basin of FIG. 7.
Figure 12:
FIG. 12 is a plan view of the top of pin cap of FIG. 11.

A drive pin 124 passes through the basin substantially coaxially with its central axis. FIGS. 1 and 4 show the orientation of the drive pin with respect to the basin where it can be seen that the basin, shaft, inserting cap and drive pin are substantially coaxial with one another as previously described. The drive pin includes a leading end 126 having a tip 128, a trailing end 130 and an end face 133. The trailing end includes a stepped portion 131 configured to limit the length of movement of the drive pin along the internal passage of the shaft. The tip has a maximum cross sectional area commensurate with the diameter of a Braille element, but slightly smaller to permit a clearance fit through the drive cap opening to facilitate the driving of a Braille element through the drive cap opening by way of the predetermined driving force being applied to the drive pin to drive the drive pin in the axial direction. The tip is preferably concave to permit centering of a Braille element engaged therewith respect to the central longitudinal axis for accurate positioning into a pre-formed aperture of a sign as well as to minimize the possibility of plastic deformation of the Braille element by the tip of the drive pin.

The drive pin also includes a Braille element receiving area 132 approximately one third of the way axially along the driving pin from the tip forming a concavity open to the circumferential face of the drive pin. The receiving area includes an upper face 134 and a lower face 136 spaced from the upper face. The receiving area includes a back wall 129 in juxtaposition with the upper and lower faces, the spacing between the upper and lower faces and their juxtaposition to the back wall being selected to limit the travel of a Braille element within the receiving area, the receiving area being sized to receive a single Braille element from the basin. In the embodiments described with respect to the drawings, the Braille elements are substantially spherical, and as such, the upper and lower faces of the receiving area, as well as the back wall, are somewhat concave in complementary form with respect to spherical Braille elements. A spring 144 in the form of a coil spring is interposed between the drive pin abutment 143 and the end face 133 of the drive pin.

A generally diagonal passage 138 extends from the back of the receiving area to penetrate the back wall and/or lower face of the receiving area and the circumferential face of the drive pin diametrically opposite the receiving area, but axially dispositioned towards the tip, passing also through the central longitudinal axis. Where compressed air is used to drive a Braille element through the diagonal passage, the diagonal passage can act as a conduit for air flow to push the Braille element therethrough.

The pin cap 145 is shown separately in 11 and 12 as well as generally in its assembled juxtaposition with the other part of the Braille inserted in FIGS. 1 and 4. The pin cap includes a stepped area 145*a* in complementary form to the stepped portion 131 of the drive pin. The pin cap is connected to the proximal portion of the shaft using the snap fit arrangement previously described and shown in FIG. 1 or by threaded connection as shown and described with respect in FIG. 4. It will be appreciated that the pin cap may be formed integrally with or connected to any one of the shaft, basin cap or basin.

Figure 2:
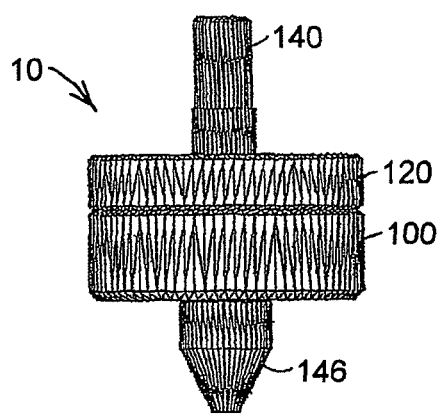
FIG. 2 is a side elevation of the Braille inserter of FIG. 1.
Figure 3:
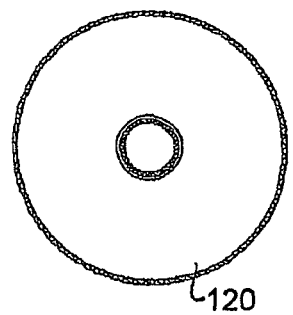
FIG. 3 is a plan view of the Braille inserter of FIG. 1.
Figure 13:
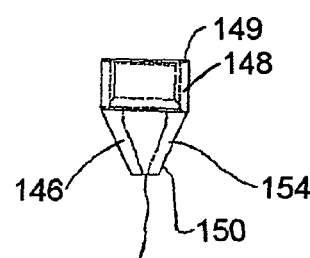
FIG. 13 is a side elevation of an inserting cap for the Braille inserter of FIG. 1.
Figure 14:
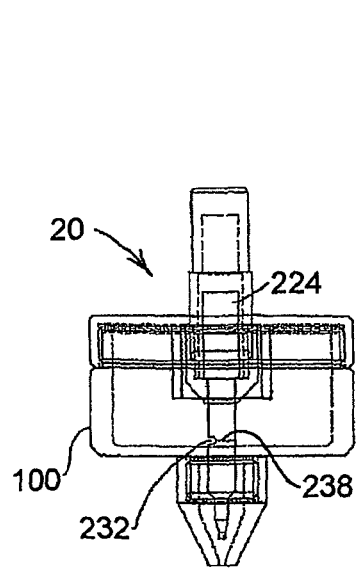
FIG. 14 is a partial cross-sectional side view of a first alternative Braille inserter according to the invention.

The inserting cap shown separately in FIG. 13 includes a near end 149 and a remote end 150 axially opposite the near end, the near end being the end nearer the basin when assembled with the remainder of the Braille inserter as shown in FIGS. 1, 2 and 4. The cylindrical portion 148 includes connection means 152 being a snap fit arrangement as shown in FIG. 1 or a threaded arrangement as shown in FIG. 4. The internal faces 158 of the cylindrical portion and the frusto-conical portion are provided with axially running grooves shown typically at 160 which assist in the guidance of a Braille element to the drive cap opening 156. When the inserting cap is attached to the lower wall portion 108 of the basin, chamber 162 is formed enclosing the leading end of the drive pin.

In use, an engraving machine may be used to form a pattern of openings in the surface of a sign using a typical engraving tool and typical engraving techniques. Once all or a predetermined number of openings have been formed, the engraving tool is disengaged from the engraving machine and replaced by a Braille inserter in accordance with the present invention. A plurality of Braille elements are provided in the basin of the Braille inserter, either preloaded therewith or as required by the engraving job being completed. In the form described with reference to FIGS. 1 to 13, compressed air enters the basin through the air opening 116 and exits therefrom through the receiving area 132, diagonal passage 138, chamber 162 and drive cap opening 156. The air flow moves the Braille elements around in the basin and causes at least one to enter the receiving area. With a Braille element in the receiving area, the drive pin is moved axially in the direction of arrow 103. The air pressure forces moving the Braille elements may vary according to the number of passages in communication with the receiving area and the amount of sealing of the reminder of the basin. The receiving area moves with the drive pin from a position where is may receive a Braille element. With a Braille element in the receiving area, the drive pin is moved axially in the direction of arrow 103, generally in a downward direction, whereupon the receiving area is closed off from the basin by passing through the opening 106 in the floor of the basin. The Braille element is thereby released into the chamber 162 below the floor of the basin. The receiving area is sloped in order to facilitate the release of the Braille element from the receiving area, and to further facilitate its passage down the diagonal passage by gravity. When the tip of the drive pin is sufficiently retracted, the Braille element moves into the opening 156 whereupon it is in position to be driven at least partly into a preformed opening. At the same time, another Braille element is received into the receiving area. Thus it will be seen that by repeated movement of the drive pin up and down, single Braille elements may be fed one at a time to the tip (that is, the remote end 150) to be driven in to a pre-formed opening to build up a Braille character with each use of the Braille inserter.

Figure 15:
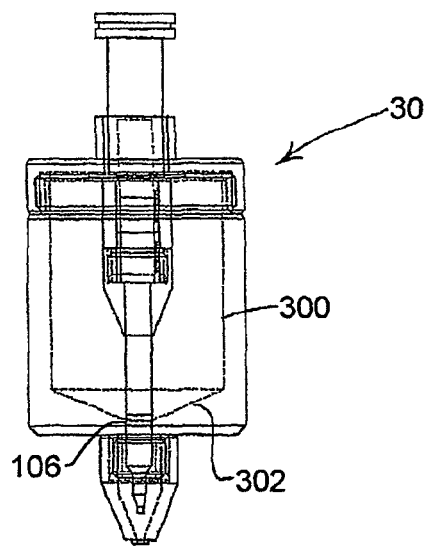
FIG. 15 is a partial cross-sectional view of the alternative Braille inserter of FIG. 17 but with a larger basin.

The first alternative Braille inserter 20 described in FIGS. 14 to 18 is similar in many respects to the Braille inserter 10 of FIGS. 1 to 13, except that an alternative drive pin 224 is provided with a circumferential passage 238 (shown in particular in the detail 17 of FIG. 17 about the drive pin and intersecting with the receiving area. The circumferential passage is bisected by a plane perpendicular to the central longitudinal axis. The first alternative Braille inserter 30 shown in FIG. 15 is the same as that shown in FIG. 14 with the exception that is has a larger basin 300, and that larger basin has a non-planar floor the configuration of which conforms to an inverted cone, concave towards the chamber formed by the walls of the basin and centered substantially about the opening through which the drive pin passes. The angle of the inverted cone in the range of 10° to 60° to the plane transecting the central longitudinal axis substantially at right angles.

The second alternative automated Braille inserter shown in FIG. 19 is similar to that shown in FIG. 1, except that it uses an internal mechanical means to move, disperse and/or agitate Braille elements. The form of the drive pin, inserting cap, lower portion of the basin are configured to provide for gravity feeding of the Braille elements into a deployment position without jamming. An alternative form of basin 400 includes a sloped floor 402 whose internal face is formed as an inverted cone in similar fashion to the larger basin shown in FIG. 15. A side wall 404 extends from the periphery of the sloped floor. An inside lower wall 405 extends from the periphery of an inner opening 403 in the other direction axially away from the side wall. An alternative insertion cap 446 is attached to the outside of the inside lower wall and includes a track 464 running from the chamber to a deployment chamber 462 to the remote end 150. The chamber includes a deployment opening 456 aligned with the driving pin—that is, concentric about the central longitudinal axis. The deployment opening is also configured to permit a tip portion 428 of a thinner drive pin 424 to pass through. An o-ring 466 is also provided about the deployment opening to retain a Braille element in position in the deployment chamber until the tip portion contacts the Braille element and drives it through the deployment opening and into a plate to be provided with Braille writing.

The second alternative Braille inserter includes a spring 468 wound around a spring-wound portion 467 of the thinner drive pin. The spring has a reduced portion 470 constituting that portion wound around the spring-wound portion of the thinner drive pin, and an expanded portion 472 having a larger diameter and pitch greater by a factor of about five than the reduced portion. The outer diameter of the expanded portion spans most of the distance across the inside lower wall of the basin. The diameter of the expanded portion is sufficient to leave a clearance space between the outer diameter of the expanded portion and the inside face of the inside lower wall less than the largest dimension of a Braille element.

The modified form of the second alternative Braille inserter 50 shown in FIG. 20 is the same as that of FIG. 19 except that a removable nosecone bush 574 is provided having a nosecone passage 576 formed to accommodate the passage of a modified thinner drive pin 524. Details of the nose cone are shown in FIG. 21. The basin is similar and may be referred to as a coniform basin 500. The nosecone has an upper frustoconical face 578 formed to assist in directing the Braille elements away from the drive pin to a side track 564. The operation of the modified Braille inserter is similar to that of FIG. 19 insofar as the holding of the Braille element by an o-ring is concerned. Although the nosecone could be formed integrally with the insertion cap, it will be appreciated that detachability of the various parts permits the selection of different materials of construction for the various parts so that materials suited to the particular functions of the parts may be accommodated—such as brass for the nosecone, stainless steel for the drive pin and aluminium for the basin and its cap.

Figure 28:
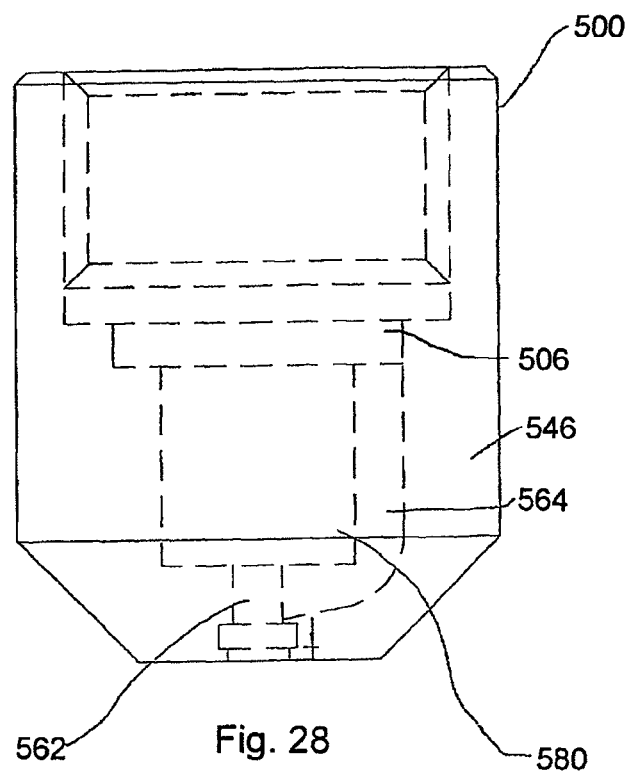
FIG. 28 is a cross-sectional side view of the basin and inserting cap of the Braille inserter of FIG. 20.
Figure 29:
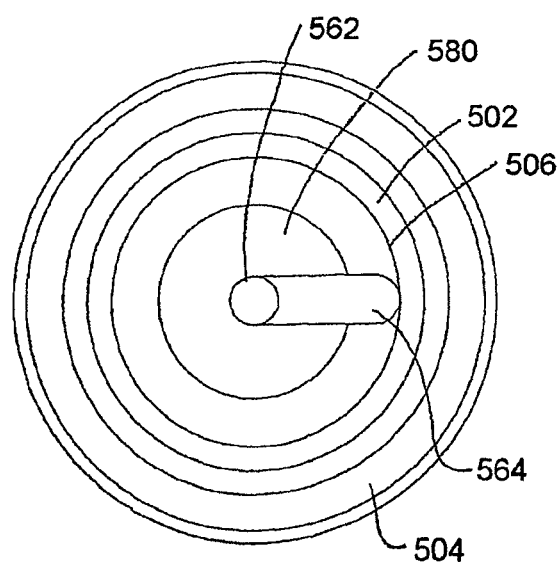
FIG. 29 is a plan view of the op of the basin and inserting cap of FIG. 30.

FIGS. 28 and 29 show the coniform basin and inserting cap without the nosecone bush. The inserting cap includes a nosecone receiving recess 580 sized and configured to receive the nosecone bush. When the nosecone bush is inserted in the nosecone receiving recess, a portion of the nosecone bush forms a portion of a wall of the side track 564. However, the relational arrangements between the wall 504, side track 564 and chamber 562 of the inserting cap are shown in FIGS. 28 and 29.

The automated Braille inserter of the present invention in its various forms or embodiments may be attached to an engraving machine using the same attachment means provided for attaching engraving tools and/or motor driven engraving devices. The configuration and placement of the basin may be varied. For example, the basin may be directly connected to the drive pin or the basin may only partially surround the drive pin. The basin may be formed into any of a variety of shapes convenient for manufacture, a particular application of for lowest cost. The basin may incorporate, constitute, or be configured as a replaceable cartridge for delivering Braille elements for deployment by the remainder of the apparatus. The basin may include a window or the like for viewing the contents thereof. The number, placement, shape, and/or capacity of the Braille element receiving area may be varied. For example, a Braille element receiving area may be positioned along the inside face of the wall of the basin and be adapted for vertical movement to permit the release of a Braille element therein into the deployment chamber. The Braille element receiving area may be fixed vertically and connected to a passage adapted to direct one or more Braille elements toward the tip of the drive pin. Multiple receiving areas may be positioned at predetermined distances from one another. The Braille element receiving area may be formed as a track as shown in FIGS. 19, 20, 28 and/or 29.

The machine used to move the drive pin may include an integral engraving element such as a laser so that the machine may form an opening with a beam emanating from the laser, and then be used to insert a Braille element into the opening. Subsequent openings may be formed and provided with respective Braille elements to form Braille writing on signage. The features and/or the components of the various forms and embodiments of the invention as described, including variations thereto as would be apparent to persons skilled in the art, may be interchanged to provide an automated Braille inserted which has minimal jamming and/or breakdown.

The foregoing description has been given by way of illustrative example of the invention and modifications in variations which would be apparent to persons skilled in the art may be made without departing from the spirit and scope of the invention as defined by the following claims.

The claims defining the invention are as follows:

1. An automated Braille inserter for inserting one or more Braille elements into a surface including:
    a basin for holding a plurality of Braille elements;
    a drive pin having a central longitudinal axis and a tip and being adapted to drive one of the Braille elements into the surface;
    a shaft connected to said basin and within which said drive pin is moveable along its longitudinal axis;
    a Braille element receiving area provided in said drive pin and spaced from said tip, said receiving area being adapted to receive therein at least one Braille element; and
    a chamber spaced apart from said basin, said receiving area being moveable from a first position at which said receiving area is capable of receiving a Braille element from said basin to a second position where the Braille element is capable of being released into said chamber, wherein said chamber includes a sidewall completely surrounding and spaced-apart from said drive pin when said drive pin is in a rest position.

2. An automated Braille inserter according to claim 1, wherein said Braille element receiving area includes an upper surface and a lower surface a fixed distance from said upper surface, said receiving area being moveable in a plane parallel to the central longitudinal axis of said drive pin to facilitate movement of a Braille element along a transit path between said basin and a position where said drive pin may drive the Braille element into the surface.

3. An automated Braille inserter according to claim 1, wherein said basin extends around more than one half the circumference about the central axis of the drive pin.

4. An automated Braille inserter according to claim 1, wherein said receiving area is configured to permit only a single Braille element to be received therein and shaped to be complementary to the shape of the Braille elements to be inserted in the surface.

5. An automated Braille inserter according to claim 1, wherein said basin includes a floor arranged at a non-perpendicular angle relative to the central longitudinal axis of said drive pin.

6. The automated Braille inserter according to claim 5, wherein the non-perpendicular angle is generally 60 degrees to the central longitudinal axis.

7. The automated Braille inserter according to claim 6, wherein said basin extends completely around the circumference of the central longitudinal axis of said drive pin.

8. An automated Braille inserter according to claim 6, wherein said drive pin is concentrically located relative to said basin.

9. An automated Braille inserter for inserting a Braille element into a surface, comprising:
   a container for containing a plurality of Braille elements;
   a drive pin in operative juxtaposition with respect to said container and adapted for movement along a drive axis between a receiving position and a driving position, and having a driving face for driving a Braille element from said Braille inserter and a Braille element receiving area provided in said drive pin;
   a Braille element passage operatively associated with said drive pin and providing operative passage of a Braille element from said container to a deployment position in operative alignment with said driving face of said drive pin;
   the drive pin being arranged in operative juxtaposition in respect of the container such that the Braille element passage is closed to receiving Braille elements from the container when the drive pin is the driving position, but may receive a predetermined number of Braille elements into said Braille element passage when the drive pin is in the receiving position; and
   a chamber spaced apart from said container, said receiving area being moveable from a first position at which said receiving area is capable of receiving a Braille element from said container to a second position where the Braille element is capable of being released into said chamber, and wherein said chamber includes a sidewall completely surrounding and spaced-apart from said drive pin when said drive pin is in a rest position.

10. An automated Braille inserter according to claim 9, wherein said receiving area is in air communication with said chamber while in the first position.

11. An automated Braille inserter according to claim 9, wherein movement of said drive pin is at least in part synchronised with movement of said receiving area.

12. A method of inserting a Braille element into a surface, comprising:
   providing a container for containing a plurality of Braille elements;
   providing a drive pin in operative juxtaposition with respect to said container and adapted for movement along a drive axis between a receiving position at which a Braille element may be received into a Braille element passage from said container and a driving position having a Braille element receiving area provided in said drive pin;
   passing a Braille element along a Braille element passage from said container to a deployment position in operative alignment with a driving face of said drive pin;
   moving said drive pin from said receiving position to said driving position whereupon the Braille element passage is closed to receiving Braille elements from the container and whereby the Braille element may be inserted into the surface; and
   providing a chamber spaced apart from said container, said receiving area being moveable from a first position at which said receiving area is capable of receiving a Braille element from said container to a second position where the Braille element is capable of being released into said chamber, wherein said chamber includes a sidewall completely surrounding and spaced-apart from said drive pin when said drive pin is in a rest position.

13. An automated Braille inserter according to claim 12, and including a passage connecting said receiving area to said chamber, said passage having a minimum cross sectional dimension that prevents movement of the Braille element therethrough.

* * * * *